Patented Feb. 21, 1933

1,898,636

UNITED STATES PATENT OFFICE

HARRY K. LINZELL, OF LA GRANGE, ILLINOIS, ASSIGNOR TO UNITED STATES GYPSUM COMPANY, OF CHICAGO, ILLINOIS, A CORPORATION OF ILLINOIS

ANHYDRITE PLASTIC MATERIAL

No Drawing.   Application filed February 16, 1931. Serial No. 516,220.

This invention relates to the hydration of naturally occurring anhydrite of anhydrous calcium sulphate and the molding of same into shapes for forming same into fillers.

This application is a continuation in part of my application No. 226,819 filed Oct. 12, 1927, now standing allowed and forfeited.

Only natural or chemically precipitated gypsum, or calcium sulphate dihydrate has heretofore been available in the manufacture of plaster of Paris. Nearly all gypsum deposits contain a certain amount of anhydrite, but in the manufacture of plaster of Paris this anhydrite acts largely as an inert impurity simply diluting the plaster of Paris and taking little, if any, more part in the set and hardening of the plaster than a similar amount of inert rock ground in the same state of subdivision. As a rule, gypsum containing more than 15-25% of anhydrite is detrimental for the production of calcined products, and in nearly all gypsum deposits, some parts of the gypsum contain more than 15% of anhydrite and must be rejected as waste material.

It is an object of this invention to provide a process whereby gypsum or calcium sulphate dihydrate may be made from natural anhydrite or a mixture of gypsum and anhydrite in which the percentage of naturally occurring anhydrite is more than 15% of the rock in the raw state.

Another object of the invention is to produce a hot slurry of calcined gypsum from natural anhydrite, said slurry being suitable for pouring into molds.

A further object of the invention is to produce a filler of natural anhydrite; also to improve anhydrite processes and products in other respects hereinafter specified and claimed.

The method of utilizing anhydrite alone by proper grinding and mixing with accelerator as a plaster without any calcination, is fairly well known, but in these products the plaster so formed is of low consistency and usually of poor plasticity. Materials such as clay, lime or asbestos have been added to increase the plasticity and water-holding power, but these additions reduce the strength of the product so that its use is limited. Other methods have been to grind the anhydrite exceedingly fine so that the particles vary from 30 microns down to the colloidal, with an average particle size of approximately 7 microns and then hydrate with water. This latter method, however, is a relatively slow process and is not commercially feasible since it requires 3 weeks or more to secure sufficient hydration. In nearly all processes of converting anhydrite to gypsum, a catalyzer is used. None of these processes, however, are commercially feasible due to the slowness of the action.

In this application, the process is for the hydration of the anhydrite or the gypsum-anhydrite mixture in which the anhydrite is in excess of 15%, resulting in calcium sulphate dihydrate or gypsum, and the calcining of the hydrated anhydrite to give plaster of Paris. This process differs from the previously mentioned process in that the anhydrite is rapidly hydrated in a continuous process on a commercially successful basis. By the method of this application the hydration can be economically carried out and a product manufactured in competion with the usual practice of making plaster of Paris from the natural gypsum. The amount of time of hydration has been materially reduced, sufficient to render possible the manufacture of plaster of Paris from anhydrite in a continuous process.

This process consists of grinding the anhydrite, in the presence of an accelerator or catalyzing agent and water, and as an optional step recovering any excess of catalyzer for reuse. The degree of grinding in this process is important, since the finer the grinding the more rapid the hydration; however, grinding need not be so fine as to render it commercially uneconomical. It has been found that by the proper control of the acidity of the mixture and of the temperature, a coarser grind may be used than otherwise is possible or the time required for hydration materially reduced. The reduction of the anhydrite may be started in crusher rolls or similar machines and finished in a Buhr stone or Raymond mill as in ordinary plaster manufacturing practice. For more rapid hydration the product of the Buhr stone or Raymond mill can be ball milled in a slurry form for varying periods, in the presence of accelerators or catalyzers.

After the initial reduction in the crusher rolls or similar machines, the accelerator and water are added and the final grinding and hydration carried out. As an alternate process, after the final grind, if hydration is not complete, the material may be carried to a slurry tank where it is slowly agitated to insure the maximum amount of particle surface exposure to the action of the accelerator. From the slurry tank the slurry may be taken to a concentrator where the slurry is partially dewatered.

The slurry of hydrated anhydrite may be further dewatered in a centrifuge or on a filter, then dried and calcined in a kettle or calciner or by other means, known to the art.

An alternative process is to calcine the hydrated anhydrite slurry, without dewatering, in a pressure chamber at a pressure varying between 15 to 20 pounds, the time of calcination being approximately 5 hours. The calcined hydrated anhydrite still in slurry form is discharged from the pressure calciner and conveyed while still hot (as close to 210° F. as possible) to the moulding room where it is either shaped directly into moulds which as they cool will set or mixed with more water, if greater fluidity is desired, then moulding. To break up lumps which may form during calcination the slurry may be ground during calcination or after calcination while still in slurry form, and still hot before casting.

The catalyzer may be any of the accelerating electrolytes which are well known to the art such as sodium or potassium sulphate, or a combination of sodium or potassium sulphate with aluminum or zinc sulphate or with sulphuric acid. I prefer to use from ½ to 2½% of catalyst, less than this slows up hydration and more than this does not give proportional acceleration. Best results are obtained by using a catalyst such as sodium or potassium sulphate, with sufficient acid present at all times to maintain a pH value of below 7, preferably about 4 to 5. While hydration does take place in a neutral solution it is much more rapid if it is kept slightly acid. If the carbonate impurities which naturally occur in the anhydrite rock are very low it may be necessary to add acid or an acid salt only at the start of the process but if high, it may be necessary to make further additions of acid to maintain this acidity. It is not economical and of no advantage to maintain an acidity below a pH of 2.

Sulphuric acid may be used alone as the catalyst; an advantage of this being that it can be neutralized at the conclusion of the hydration by the addition of lime. Hydration, however, is not as rapid as with a combination of the acid and an alkali metal salt such as sodium sulphate. The temperature during the hydration of the anhydrite must be maintained below 40° C. and above the freezing temperature of the mixture.

In further reference to the accelerators the best ones are the monovalent alkali metal salts of the strong inorganic acids such as sodium sulphate, and including ammonium salts combined with either free acids such as sulphuric, nitric or hydrochloric or with the salts of these acids, and the metals, which will hydrolyze in water to give these acids. Examples of this latter are $(Al_2(SO_4)_3$, $FeCl_3$, $CdCl_2$, $ZnSO_4$.

While any of these types will accelerate alone, a combination of the first type with either the free acids mentioned above or with the latter type gives a much faster rate of acceleration.

Examples are:
(1) $Na_2SO_4$ plus $H_2SO_4$ (Salt plus free acid)
(2) $Na_2SO_4$ plus $Al_2(SO_4)$ (Salt plus acid by hydrolysis)
(3) $KCl$ plus $CdCl_2$
(4) $NaCl$ plus $ZnSO_4$ Sea water, which is naturally high in soluble salts, is a satisfactory medium for the hydration of anhydrite. Sufficient sulphuric acid should be added to maintain a slight acidity at all times.

The hydrated anhydrite which is in a highly dispersed form having a particle size of 1 to 50 microns and freed from carbonates by the action of the acid accelerator and washing and from silica and heavy materials by sedimentation, forms a filler suitable for paper, tooth paste, and for certain types of plastics, such as casein plastics.

If the anhydrite and the gypsum mixture be ground to a fineness of 9% on a 100 mesh screen and 84% through a 200 mesh screen, which can easily be obtained by dry grinding, and mixed with 100 parts by weight of water and 2½% of the sulphate equivalent of the sodium acid sulphate, 80% hydration may be obtained in 24 hours with no ball-milling and only gentle agitation. If the anhydrite ground to the same fineness as above, be placed in a ball mill for 1 hour in the presence of 50 parts of water to 100 parts of anhydrite with the same amount of accelerator, 80% hydration will be obtained in 10 hours. Using the ball mill in a continuous wet grinding process, 80% hydration may be obtained in 5 hours or less. It is not necessary, in the continuous wet ball milling process to start with so fine a grind as given above, as this reduction may be made easily in the wet ball mill in the presence of the accelerator. This amount of hydration of the anhydrite in the presence of the gypsum anhydrite mixture is given, since 80% hydration is sufficient for most plasters. Of course, if a higher degree of hydration is desired or necessary, a longer time to complete the reaction will be required. These results were obtained with an anhydrite very low in carbonates. Anhydrites with more carbonate impurities will require a proportional increase in acid content.

The agitation or grinding of the slurry during calcination tends to produce a product having a higher consistency and a lower strength, but the molding while hot partially compensates for this. As a result, casts of fair strength are produced. The heat in the slurry and the exothermic heat of setting helps to partially dry the casts, thereby effecting a saving in drying costs. By the hot molding of calcined slurry, the drying of the hydrated anhydrite or the calcined gypsum is avoided, with a corresponding saving in operating costs.

The fineness of grinding given herein may be varied considerably without departing from the scope of this invention, keeping in mind that the finer the grind the more rapid the hydration, or the greater the percentage of hydration obtainable. This process herein disclosed may be used with pure anhydrite, but anhydrite is rarely pure in its actual form since it occurs more often as an impurity in gypsum deposits, carbonates also usually being present. The greater the percentage of gypsum present in the mixture, the richer will be the final mixture to be calcined. The method of pressure calcination followed by hot molding may be also carried out starting with ground up gypsum rock as a base, rather than starting with anhydrite as a base.

I would state in conclusion, that while the examples described constitute a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. The method of hydrating natural anhydrite, which includes ball mill grinding said anhydrite in the presence of a dilute solution of a hydration accelerating chemical.

2. The method of hydrating natural anhydrite, which includes grinding said anhydrite in the presence of a water solution of an accelerator.

3. The method of hydrating natural anhydrite, which includes grinding said anhydrite in the presence of a dilute solution of sodium acid sulphate.

4. The method of preparing plaster of Paris from natural anhydrite, which includes grinding the anhydrite in the presence of a water solution of an accelerator, separating the excess accelerator solution; and calcining the hydrated gypsum.

5. The method of preparing a partially hydrated form of gypsum from natural anhydrite, which includes grinding the anhydrite in the presence of a water solution of an accelerator, removing the excess of accelerator solution, and calcining the hydrated anhydrite to remove a portion of the water of crystallization therefrom.

6. The method of hydrating natural anhydrite in granular form, which comprises subjecting the particles to the action of an accelerator solution, and continuously removing hydrated gypsum from the surface of the particles by grinding so as to expose fresh particle surfaces to the action of the accelerator solution.

7. The method of hydrating natural anhydrite, which includes grinding said anhydrite in the presence of a dilute solution of a hydration accelerating chemical, and maintaining the acidity of the mixture during grinding at a pH valve of 2 to 7.

8. The method of hydrating natural anhydrite, which includes grinding said anhydrite in the presence of a water solution of a hydration accelerator while maintaining the temperature of the mixture below 40° C. and above the freezing temperature of the mixture.

9. Hydration of anhydrite by grinding in the presence of sufficient sulphuric acid to maintain an acidity at all times below 7, then neutralizing with lime at the conclusion of hydration, the temperature during hydration being maintained below 40° C.

10. The production of the hemihydrate of calcium sulphate from anhydrite, by grinding the anhydrite in water with sodium sulphate, and sufficient free inorganic acid to maintain an acidity at all times, then washing to free from accelerator, and calcining to hemihydrate.

11. The hydration of anhydrite during grinding in the presence of a combination accelerator composed of the inorganic salt of an alkali metal, and the inorganic salt of a metal which hydrolyzes in water to give an insoluble hydroxide and free acid.

12. The hydration of anhydrite by grinding and then hydrating in slurry form below 40° C. at a pH acid valve 7 or less, in the presence of sodium or potassium sulphate.

13. The method of treating natural anhydrite, which comprises grinding said anhydrite in slurry form in the presence of a hydration accelerator to hydrate said anhydrite, heating said slurry to calcine said hydrated anhydrite, running the resulting hot slurry of calcined gypsum into molds, and permitting said slurry to cool and set in said molds so that the heat of the slurry and the exothermic heat aids in drying the resulting cast.

14. The method of treating natural anhydrite, which comprises grinding said anhydrite in slurry form to hydrate said anhydrite, heating said slurry to calcine said hydrated anhydrite, running the resulting hot slurry of calcined gypsum into molds, and permitting said slurry to cool and set in said molds.

15. The method of treating natural anhydrite, which comprises grinding said anhydrite in slurry form to hydrate said anhydrite, and heating said slurry under pressure to calcine said hydrated anhydrite to a slurry of calcium sulphate hemihydrate, said resulting hot slurry being suitable for running directly into forms and to cool and set to solid state.

16. The method of hydrating natural anhydrite which includes grinding said anhydrite in the presence of an accelerator solution consisting of sea water together with free inorganic acid.

17. The method of forming molded gypsum articles, which comprises heating a slurry of gypsum in water under pressure until said gypsum is converted to calcium sulphate hemihydrate and pouring the resultant calcined gypsum slurry into molds.

18. The method of forming molded gypsum articles which comprises heating a slurry of gypsum in water under pressure until said gypsum is converted to calcium sulphate hemihydrate, maintaining the temperature of said slurry in excess of 175° F., pouring the hot, calcined gypsum slurry into molds, and permitting said slurry to cool and set to solid form.

19. A finely dispersed filler, comprising hydrated natural anhydrite having a particle size of 1 to 50 microns.

HARRY K. LINZELL.